Sept. 17, 1946.　　　W. G. PRENTICE　　　2,407,683
CABLE SPLICE VULCANIZING MOLD
Filed Aug. 14, 1944　　　2 Sheets-Sheet 1

INVENTOR.
WILLIAM G. PRENTICE,
BY
Hood & Hahn
ATTORNEYS.

Sept. 17, 1946.    W. G. PRENTICE    2,407,683
CABLE SPLICE VULCANIZING MOLD
Filed Aug. 14, 1944    2 Sheets-Sheet 2

INVENTOR.
WILLIAM G. PRENTICE,
BY    Hood & Hahn
ATTORNEYS.

UNITED STATES PATENT OFFICE 2,407,683

CABLE SPLICE VULCANIZING MOLD

William G. Prentice, Indianapolis, Ind.

Application August 14, 1944, Serial No. 549,398

2 Claims. (Cl. 18—18)

The object of my invention is to provide a vulcanizing press particularly designed for vulcanizing splices in multi-wire cables.

The accompanying drawings illustrate my invention.

Figure 1:
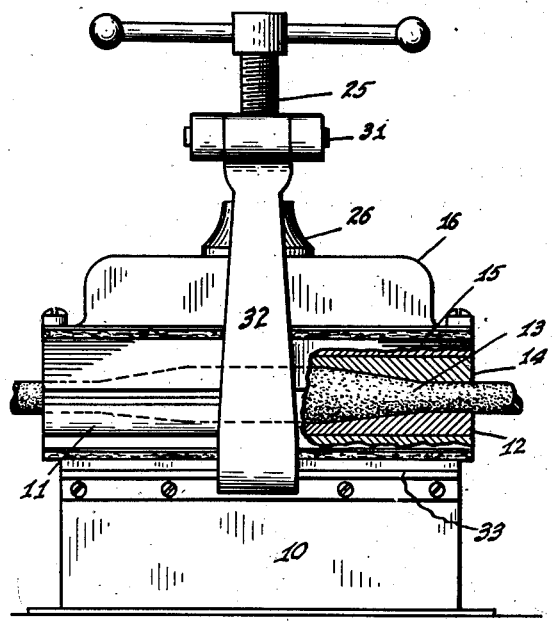
Fig. 1 is a side elevation in partial section with the completed splice in position.

In the drawings 10 indicates the main body provided with an electrical heating element of well known form and having in its upper surface a cavity for the removable reception of a forming jaw 12 having in its upper surface a cavity properly formed for the reception and final forming of a newly spliced cable 13.

Mating with the heating jaw 12 is a similar heating jaw 14 which complements jaw 12 and is removably mounted in a heating block 15 provided with an electrical heating element of well known form. Associated with heating block 15 is a pressure block 16.

Figure 5:
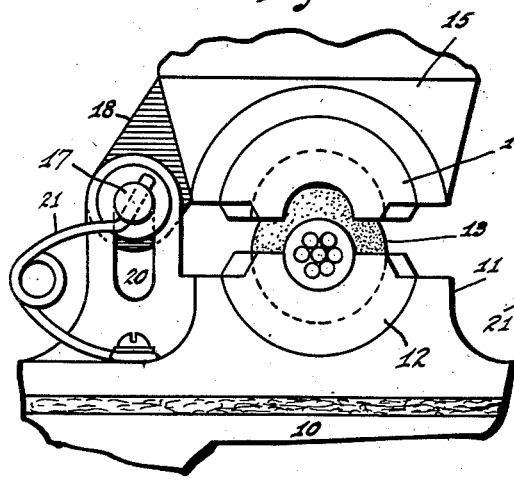
Fig. 5 is a fragmentary enlarged end elevation with the vulcanizing jaws in initial position at the beginning of the vulcanizing period.
Figure 6:
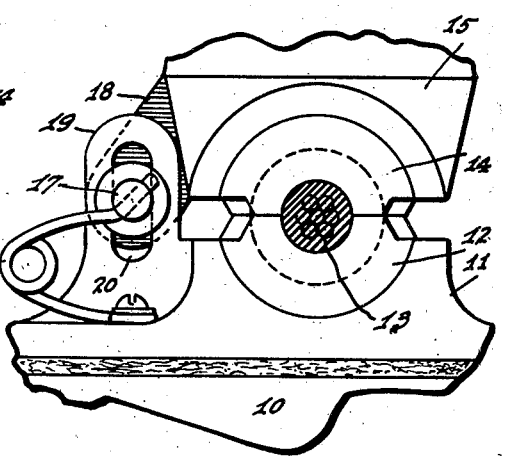
Fig. 6 is a view similar to Fig. 5 with the jaws in final position.
Figure 3:
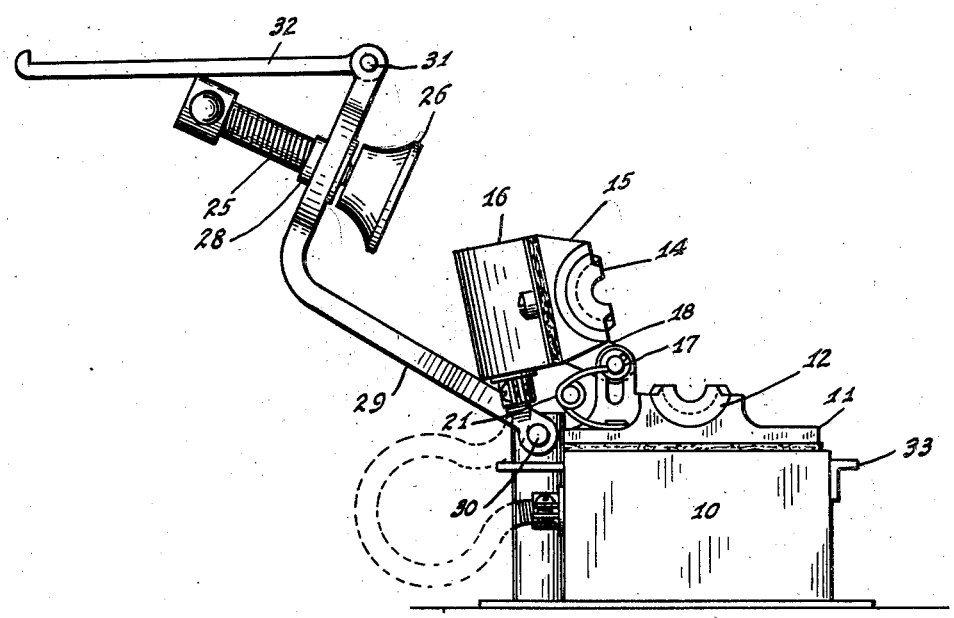
Fig. 3 is an end elevation with the parts in open position.
Figure 4:
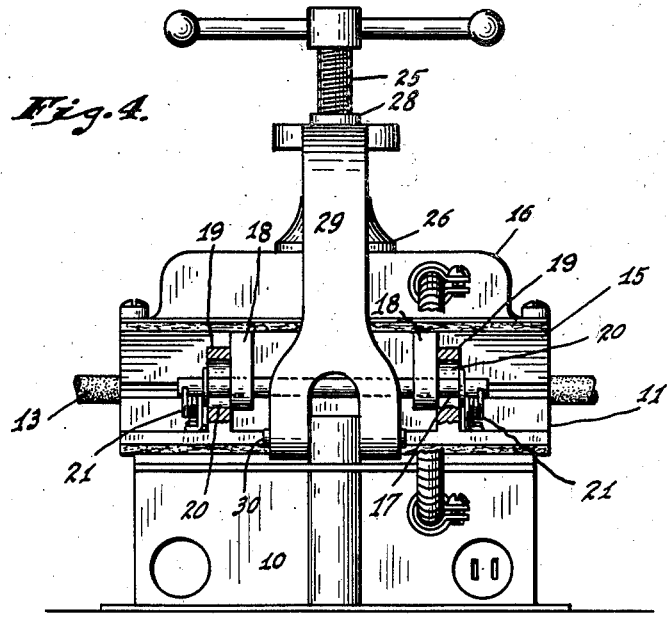
Fig. 4 is a side elevation, in partial vertical section, of the side opposite that shown in Fig. 1.

Block 15 is swingably supported upon a trunnion 17, the axis of which is parallel with the axis of the forming jaws 12—14, carried by ears 18 between ears 19 integral with block 11. The ears 19 are provided with vertical slots 20 into which the opposite ends of trunnion 17 project. The vertical extent of slots 20 is such that when trunnion 17 is in its uppermost position, as shown in Fig. 5, jaw 14 when swung to the position shown in Fig. 5 to contact a newly spliced cable 13 laid in jaw 12, will have its axis accurately vertically above the axis of jaw 12, and in order to insure such desirable accurate positioning of jaw 14, trunnion 17, together with the parts 14, 15 and 16 carried thereby, is normally but yieldingly urged upwardly to the limit defined by slots 20 by springs 21.

Figure 2:
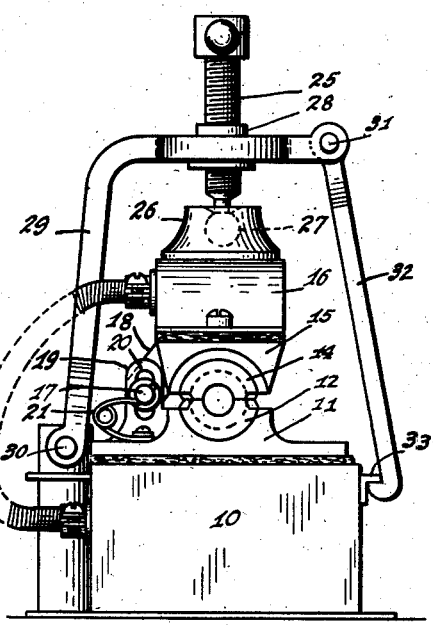
Fig. 2 is an end elevation with the cable omitted.

In order to exert the desired and necessary pressure upon jaw 14 to urge it upon the freshly spliced cable, I provide a pressure screw 25 provided with a pressure foot 26 associated with the screw 25 in a well known manner by a ball-and-socket joint 27, as indicated by dotted lines in Fig. 2. Screw 25 is threaded through a nut 28 carried by a swinging arm 29 pivoted at 30 on base 10. Pivoted at 31 at the free end of arm 29 is a hook 32 adapted to engage catch 33 on base 10.

The proper splicing of a multi-wire cable involves the application, to the spliced wires, of a wrapping of rubber tape which must be thereafter vulcanized.

The applied rubber tape, while roughly symmetrical relative to the axis of the cable, generally contains some excess and is only roughly symmetrical and it is desirable that, in the performance of the vulcanizing operation, the jaws be so placed as to insure accuracy of correlation.

I am aware that vulcanizing apparatus quite similar to that described above and comprising two mating forming jaws one pivoted relative to the other and associated with pressure mechanism, has been used heretofore. In some of those devices the pivoted jaw has been carried by a relatively fixed trunnion so positioned that accurate mating of the jaws will occur when the swinging jaw is brought to its ultimate position, but with such a construction, especially where a newly formed splice embodies considerable excess of rubber tape, the initial mating of the swinging jaw with the splice is such that too much of the excess will be sheared off by the swinging jaw at one side of the axis of the cable. I am also aware of previous devices of this general type where the movable jaw is capable of manual association vertically above the lower jaw and resting upon the unvulcanized fresh splice, but in haste of operation of such devices, many workmen fail to take the necessary precautions to attain accurate placement of the movable jaw, the result being an unsymmetrical shearing of the vulcanizable material during the initial heating period.

The advantage of my present construction resides in the fact that the springs 21 insure that the trunnion 17 will be initially in its uppermost position so that when the workman, even in the utmost haste, swings the jaw into engagement with a fresh splice, those springs will accurately locate the axis of the cavity of the upper jaw vertically above the axis of the cavity of the lower forming jaw. Thus when pressure is applied by screw 25, the upper jaw, being guided by the trunnion 17 in slots 20, will move accurately in a straight line to final mating with the lower jaw 12, in the meantime squeezing out the surplus softened rubber uniformly along both sides of the splice to attain a vulcanized insulation of the splice which will be symmetrical with the axis of the cable ends.

It will be noted that there is a spring 21 at each end of trunnion 17 so that if the freshly formed splice is excessive near one end or the other, the upper jaw is free to cant to some extent in the vertical plane of the axis of the jaws, due to the presence of the ball joint 27, but that the ultimate positioning of the upper jaw will be at rest upon, and therefore in axial coincidence with, the lower jaw.

I claim as my invention:

1. A splice vulcanizing mechanism comprising two elongated mating jaws each formed to provide an elongated splice-receiving cavity, an elongated trunnion movable in a plane normal to the mating plane of said jaws and disposed parallel to said cavities, one of said jaws being mounted for swinging movement on said trunnion, means for guiding and limiting the movement of said trunnion, spring means disposed to urge said trunnion away from the other of said jaws and permitting tilting movement of said trunnion, and means for applying pressure substantially to the center of said one jaw to urge said one jaw toward said other jaw.

2. A splice vulcanizing mechanism comprising two elongated mating jaws each formed to provide an elongated splice-receiving cavity, an elongated trunnion movable in a plane normal to the mating plane of said jaws and disposed parallel to said cavities, one of said jaws being mounted for swinging movement on said trunnion, means for guiding and limiting the movement of said trunnion, separate spring means independently supporting the opposite ends of said trunnion and urging said trunnion ends away from the other of said jaws, and means for applying pressure substantially to the center of said one jaw to urge said one jaw toward said other jaw.

WILLIAM G. PRENTICE.